United States Patent
Michel et al.

(10) Patent No.: US 9,972,129 B2
(45) Date of Patent: May 15, 2018

(54) COMPRESSION OF A THREE-DIMENSIONAL MODELED OBJECT

(71) Applicant: DASSAULT SYSTEMES, Velizy Villacoublay (FR)

(72) Inventors: Fabrice Michel, Paris (FR); Malika Boulkenafed, Courbevoie (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days. days.

(21) Appl. No.: 15/339,676

(22) Filed: Oct. 31, 2016

(65) Prior Publication Data

US 2017/0124761 A1    May 4, 2017

(30) Foreign Application Priority Data

Oct. 30, 2015   (EP) ..................................... 15306739

(51) Int. Cl.
*G06T 17/20*    (2006.01)
*G06K 9/46*    (2006.01)
(Continued)

(52) U.S. Cl.
CPC ............ *G06T 17/20* (2013.01); *G06K 9/4604* (2013.01); *G06K 9/4652* (2013.01);
(Continued)

(58) Field of Classification Search
CPC ......... G06T 17/20; G06T 17/205; G06T 3/40; G06T 3/20; G06T 2200/04;
(Continued)

(56) References Cited

U.S. PATENT DOCUMENTS 6,508,768 B1 *   1/2003   Hall ......................... A61B 8/08
                                                                  600/443
9,519,999 B1 *   12/2016   Gharpure ................ G06T 17/00
(Continued)

FOREIGN PATENT DOCUMENTS

EP    2 833 326 A1    2/2015
EP    2 887 305 A1    6/2015

OTHER PUBLICATIONS

Zachi Karni and Craig Gotsman. 2000. Spectral compression of mesh geometry. In Proceedings of the 27th annual conference on Computer graphics and interactive techniques (SIGGRAPH '00). ACM Press/Addison-Wesley Publishing Co., New York, NY, USA, 279-286.*

(Continued)

*Primary Examiner* — Phi Hoang
(74) *Attorney, Agent, or Firm* — Oblon, McClelland, Maier & Neustadt, L.L.P.

(57) ABSTRACT

The invention notably relates to a computer-implemented method for compressing a three-dimensional modeled object. The method comprises providing a mesh of a three-dimensional modeled object, parameterizing (u,v) the mesh on a two-dimensional plane, converting the parameterized mesh into an image I, defining a grid of cells from the image I, each cell being defined by a set of control points, computing a relevance of each cell of the grid, determining at least one cell having a relevance lower than a pre-determined threshold, resizing the at least one determined cell and computing a resulting grid, computing a transformation for each pixel of the image from the resulting grid, and applying the computed transformation to the image I.

15 Claims, 7 Drawing Sheets
(4 of 7 Drawing Sheet(s) Filed in Color)

(51) Int. Cl.
  *G06T 3/40* (2006.01)
  *G06T 3/20* (2006.01)
  *G06K 9/52* (2006.01)
(52) U.S. Cl.
  CPC .............. *G06K 9/4671* (2013.01); *G06K 9/52* (2013.01); *G06T 3/20* (2013.01); *G06T 3/40* (2013.01); *G06T 2200/04* (2013.01); *G06T 2207/20021* (2013.01)
(58) Field of Classification Search
  CPC .... G06T 2207/20021; G06F 2212/403; G06K 9/4671; G06K 9/52; G06K 9/4652; G06K 9/4604
  See application file for complete search history.

(56) References Cited

U.S. PATENT DOCUMENTS

| | | | |
|---|---|---|---|
| 2005/0151733 A1 | 7/2005 | Sander et al. | |
| 2005/0168460 A1* | 8/2005 | Razdan | G06F 17/30398 345/419 |
| 2006/0228009 A1* | 10/2006 | Fidrich | G06T 7/12 382/128 |
| 2011/0103654 A1* | 5/2011 | Lavoie | G06T 7/0012 382/128 |
| 2011/0279293 A1* | 11/2011 | Deslandes | G06T 9/00 341/87 |
| 2012/0189220 A1* | 7/2012 | Ahn | G06T 9/001 382/238 |
| 2015/0149139 A1* | 5/2015 | Chavez | E21B 43/00 703/10 |
| 2016/0063737 A1* | 3/2016 | Mammou | G06T 9/001 345/423 |
| 2016/0086353 A1* | 3/2016 | Lukac | G06T 9/00 345/419 |

OTHER PUBLICATIONS

Aaron Lee, Henry Moreton, and Hugues Hoppe. 2000. Displaced subdivision surfaces. In Proceedings of the 27th annual conference on Computer graphics and interactive techniques (SIGGRAPH '00). ACM Press/Addison-Wesley Publishing Co., New York, NY, USA, 85-94.*

Search Report dated May 13, 2016 in European Application No. 15306739.2-1502.

* cited by examiner

COMPRESSION OF A THREE-DIMENSIONAL MODELED OBJECT

FIELD OF THE INVENTION

The invention relates to the field of computer programs and systems, and more specifically to a method, system and program for compressing a three-dimensional modeled object.

BACKGROUND

The field of mesh simplification aims at rearranging and pruning the vertices of a mesh in order to reduce the number of arcs in the mesh and thus allowing faster computations on meshes, better compression ratios, and overall better algorithm efficiency. A complete review of remeshing algorithms can be found in Alliez et al., *Recent Advances in remeshing of Surfaces*, Shape Analysis and Structuring, 2008.

Wang et al., *Content-Aware Geometry Image Resizing*, in Computer Graphics International 2010 (CGI 2010) Short Papers, Singapore, 2010 discloses Content aware image Resizing algorithms that are applied to a geometry image in order to reduce its size and its contents in a non-uniform manner allowing to lay emphasis on parts of the mesh with the most details while removing less noticeable vertices. The concept of Geometry Image was discussed by Gu et al. in Gu et al., *Geometry Images*, SIGGRAPH, 2002, in which mesh parameterization is conducted for the creation of a 2D structure named Geometry image. In the Geometry Image for each vertex xyz in the model is associated an RGB value coding the xyz values. This very efficient scheme conducts to the creation of a regularized mesh that is imposed by the grid structure of the image.

However, the method of Wang et al suffers at least the following two drawbacks. First, the content aware image retargeting algorithms used do not create smooth transformations of the image thus creating visible artefacts in the mesh when its reduction is large, e.g. spurious vertices. Noon-smooth deformations create local maxima in the derivatives of the Geometry Image, thus rendering further compression much more difficult. For instance, as the image is reduced the compression ratio of this image lowers; this is due to the creation of artifacts in the continuity of the image and its derivatives.

Second, the algorithms used are specifically created for images, thus completely disregarding the fact that the final end product is a simplified mesh. For instance, preserving the boundary regularity of the geometry image may be not relevant when performing a mesh simplification.

Within this context, there is still a need for an improved method for the simplification of a three-dimensional mesh. In particular, the method should selectively reduce the geometry image in a smooth and regular fashion.

SUMMARY OF THE INVENTION

It is therefore provided a computer-implemented method for compressing a three-dimensional modeled object. The method comprises providing a mesh of a three-dimensional modeled object; parameterizing (u,v) the mesh on a two-dimensional plane; converting the parameterized mesh into an image I; defining a grid of cells from the image I, each cell being defined by a set of control points; computing a relevance of each cell of the grid; determining at least one cell having a relevance lower than a pre-determined threshold; resizing the at least one determined cell and computing a resulting grid; computing a transformation for each pixel of the image from the resulting grid; and applying the computed transformation to the image I.

The method may further comprise:
- the determination of the said at least one cell having a relevance lower than a pre-determined threshold comprises the determination of a set of cell(s) having the lowest relevance;
- providing an image significance by computing a significance of each pixel in the image I;
- extracting an original spatial domain $\Omega$ of the Significance Image;
- providing a transformation $T_\theta$, parameterized as an interpolating spline by a set of control points, from the original spatial domain $\Omega$ to a resized spatial domain $\Omega'$;
- defining a grid of cells from the image I comprises subdividing the original spatial domain $\Omega$ into cells, each cell being defined by a subset of control points of the set;
- computing a relevance of each cell of the grid comprises computing, for each cell, a weighted average of the significance of the pixels in the cell, the weighted average being computed using the interpolating spline; and wherein computing a transformation for each pixel of the image I from the resulting grid comprises computing the transformation $T_\theta$ over a spatial domain of the image I obtained by the conversion of the parameterized mesh from the resulting grid;
- the transformation $T_\theta$ is parameterized as a free form deformation interpolating spline, and wherein displacement function $u_\theta(x)$ is defined by the equation $$u_\theta(x) = \sum_{k=0}^{3} \sum_{l=0}^{3} B^k\left(\frac{x_w}{s_w} - \left\lfloor \frac{x_w}{s_w} \right\rfloor\right) B^l\left(\frac{x_h}{s_h} - \left\lfloor \frac{x_h}{s_h} \right\rfloor\right) \theta\left(\frac{x_w}{s_w} + k, \frac{x_h}{s_h} + l\right)$$

wherein $B^0$, $B^1$, $B^2$, $B^3$ are Cubic B-splines functions, $\theta$ is a function representing the control points, $s_w$ is the spacing between two control points in an horizontal direction, $s_h$ is the spacing between two control points in a vertical direction, $x_w$ is the position of a pixel in the original spatial domain $\Omega$ on an horizontal axis, $x_h$ is the position of a pixel in the original spatial domain $\Omega$ on a vertical axis; and wherein the set of control points form a grid and $\theta$ is the function representing the grid of control points;

the computation of the significance of each pixel is carried out with the function $SI = \alpha E_{geom} + (1-\alpha) E_{norm}$ where $\epsilon$ [0:1];

where $$E_{geom} = \sum_{c \in RGB} \sqrt{\left(\frac{\partial}{\partial x} G_\sigma * geom(c)\right)^2 + \left(\frac{\partial}{\partial y} G_\sigma * geom(c)\right)^2}$$

and geom(c) is the $c^{th}$ color channel of the image I and $G_\sigma$ is a Gaussian kernel;

where $$E_{norm} = \sum_{c \in RGB} \sqrt{\left(\frac{\partial}{\partial x} G_\sigma * norm(c)\right)^2 + \left(\frac{\partial}{\partial y} G_\sigma * norm(c)\right)^2}$$

and norm(c) is the cth color channel of the image of normal and $G_o$ is the Gaussian kernel;

the computation of the significance of each pixel further comprise selecting, upon user action, two or more vertices of the mesh; translating the user selection into a chart of vertices; setting the coefficient α=0 to minimize the significance the pixels of the Geometry Image linked to the vertices of the chart;

the computation of the significance of each pixel further comprise selecting, upon user action, two or more vertices of the mesh; translating the user selection into a chart of vertices; setting the coefficient α=1 to maximize the significance the pixels of the Geometry Image linked to the vertices of the chart;

the steps of defining a grid of cells from the image I, computing a relevance of each cell of the grid, determining at least one cell having a relevance lower than a pre-determined threshold, determining at least one cell having a relevance lower than a pre-determined threshold, resizing the at least one determined cell and computing a resulting grid, computing a transformation for each pixel of the image from the resulting grid, and applying the computed transformation to the image I are iterated until the computed transformation to the image I satisfies a compression criteria;

the iteration stops when at least one of the following a compression criteria is reached no more cell of the grid has a relevance lower than the pre-determined threshold; a compression rate of a new image J obtained by applying the computed transformation to the image I reaches a given threshold; a number of pixels of a new image J obtained by applying the computed transformation to the image I reaches a given value threshold;

the number of control points of the set is increased for each iteration.

resizing the at least one determined cell comprises reducing the said at least one determined cell, wherein the reduction of the said at least one determined cell is performed by bringing closer to the vertices of the said at least one determined cell all the vertices to the left and to the right of the cell; and bringing closer to the vertices of the said at least one determined cell all the vertices to the top and to the bottom of the cell;

comprising building a three-dimensional modeled object from a new image J obtained by applying the computed transformation to the image I;

resizing the at least one determined cell and computing a resulting grid is carried out regardless keeping straight the edges of the image I.

It is further provided a computer program comprising instructions for performing the above method.

It is further provided a computer readable storage medium having recorded thereon the above computer program.

It is further provided a system comprising a processing circuitry coupled to a memory, the memory having recorded thereon the above computer program.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention will now be described, by way of non-limiting example, and in reference to the accompanying drawings, where.

DETAILED DESCRIPTION OF THE INVENTION

Figure 1:
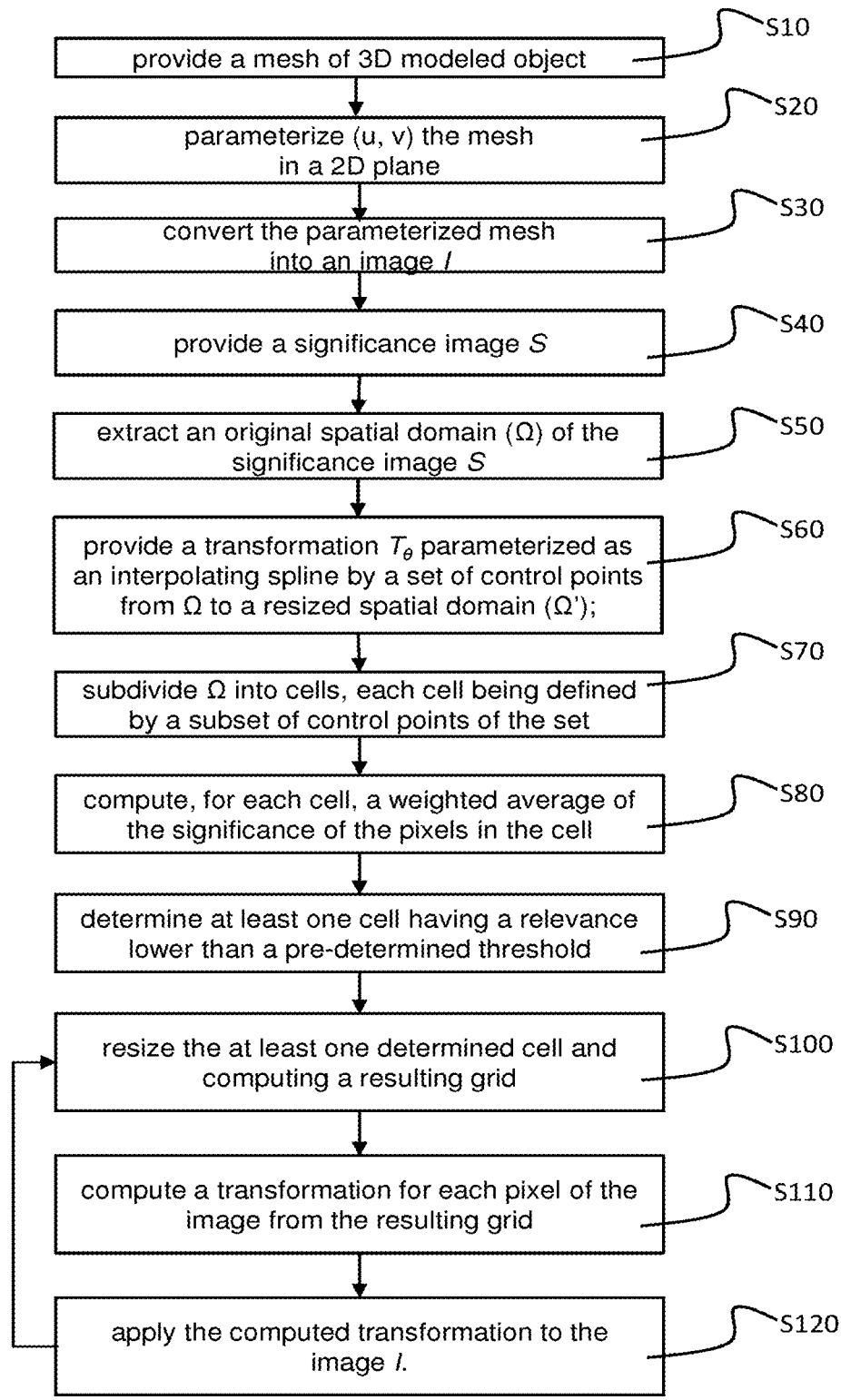
FIG. 1 shows a flowchart of an example of the method.

With reference to the flowchart of FIG. 1, it is proposed a computer-implemented method for compressing a three-dimensional (3D) modeled object. The method comprises providing a mesh of a 3D modeled object. Then, the mesh is parameterized (u,v) on a two-dimensional (2D) plane. The parameterized mesh is then converted into an image I, e.g. the image I is a Geometry Image. Then, a grid of cells is defined from the image I. Each cell of the grid is defined by a set of control points. The grid is thus formed from the set of control points. Then a relevance of each cell of the grid is computed; all the cell forms together a summary image. Next, one determines one or more cells having relevance lower than a pre-determined threshold, e.g. k cells with the lowest relevance are selected. Then, the cells that were determined are resized by moving (or displacing) the control points, and a resulting grid is computed. The resulting grid is a new grid obtained after one or more control points have been displaced. Then, a transformation is computed for each pixel of the image from the resulting grid, and the computed transformation is applied to the image I. Such a method improves the simplification of a three-dimensional mesh.

Notably, the present invention allows to reduce the geometry image in a smooth and regular fashion. Indeed, the present invention removes the areas of the Geometry Image in which the color does not change or slightly change. The model represented by the Geometry Image is thus reduced by removing the areas of the Geometry Image that comprise redundant (and thus useless) information regarding the mesh. Furthermore, the present invention do not preserve a square geometry image. This allows carrying out a minimization of the information without regards to the image boundaries.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of providing may be triggered upon user-action, e.g. the user selects the 3D model to be compressed.

A typical example of computer-implementation of the method is to perform the method with a system adapted for this purpose. The system comprise a processor (also referred to as processing circuitry) coupled to a memory. The system may also comprise a graphical user interface (GUI). The memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 16:
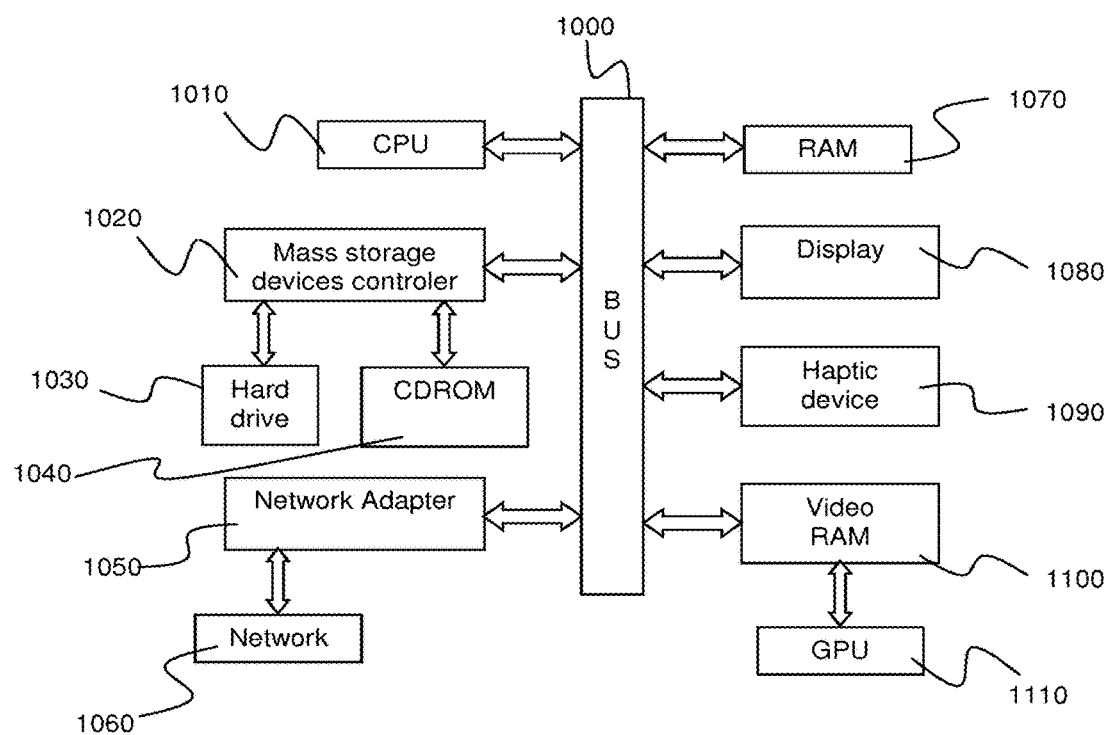
FIG. 16 shows an example of a computer system for carrying out the method according to the invention.

FIG. 16 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying non-transitory computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. Said storage medium is a non-transitory storage medium. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIG. 1, at step S10, a mesh of 3D object is provided. The 3D object may be a 3D modeled object. This step may be performed upon user action, e.g. the user selects a 3D modeled object that may be stored on a memory. This may also be automatically achieved by the computer system performing the method. Providing means that the mesh of the 3D modeled object is available to the computer system, that is, the system can access data relative to the mesh. Typically, the computer system may display the mesh of the 3D modeled object once it is available to the system, as presented for instance on FIG. 2 that shows the mesh of a 3D modeled object modeling a head.

Then, at step S20, the mesh provided at step S10 is parameterized (u, v) in a 2D plane. Parameterizing the mesh in a 2D plane means that it is determined the parameters necessary for having a specification of the 3D modeled object in a 2D space. In practice, the parameterization comprises the identification of a complete set of effective coordinates (u, v) of each vertex of the mesh in the 2D plane. Parameterization is performed as known in the art, e.g. ABF++ parameterization algorithm may be used. For example this can be done so that the whole mesh may be unfold in the two-dimensional plane with less distortion or so that the mesh cut into a small number of charts may be unfold in the two-dimensional plane with less distortion.

Figure 2:
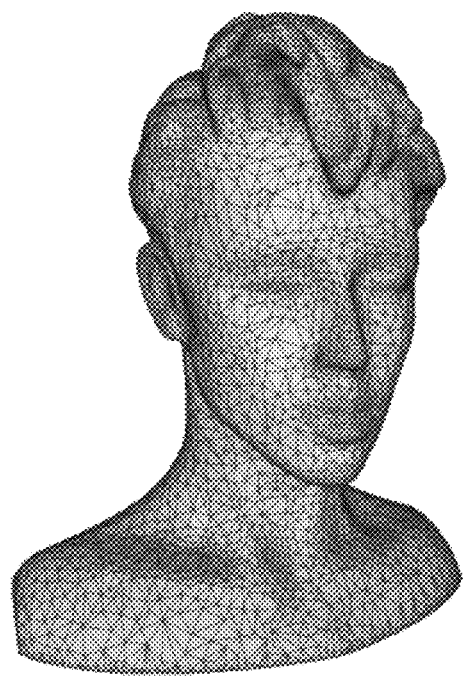
FIG. 2 shows an example of a mesh of a 3D modeled object.
Figure 4:
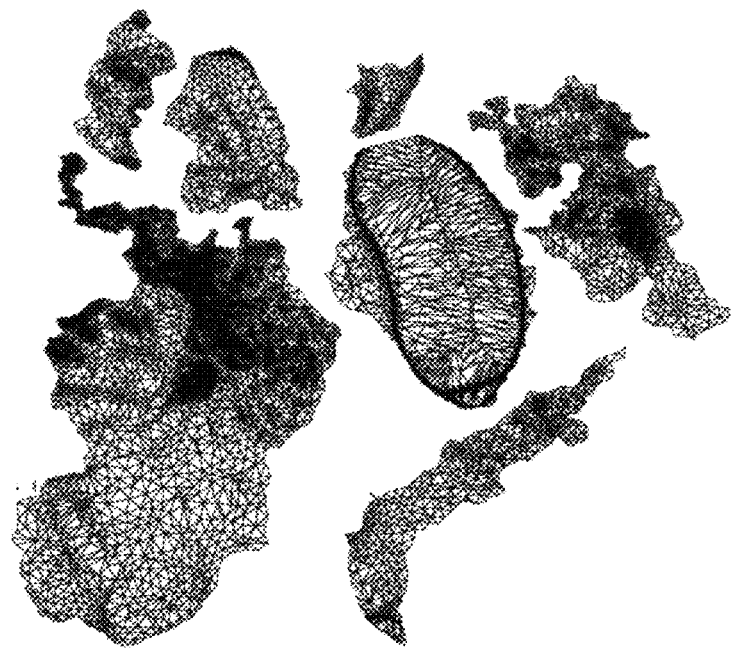
FIG. 4 shows the mesh of FIG. 2 after being parameterized.

FIG. 4 shows the mesh of FIG. 2 that have been parameterized in a 2D plane. The parameterization of the mesh results in a set of vertices having two-dimensional coordinates (u,v) in a 2D plane. Interestingly, each vertex of the original mesh of the 3D modeled object is represented by one vertex in the 2D plane.

Figure 3:
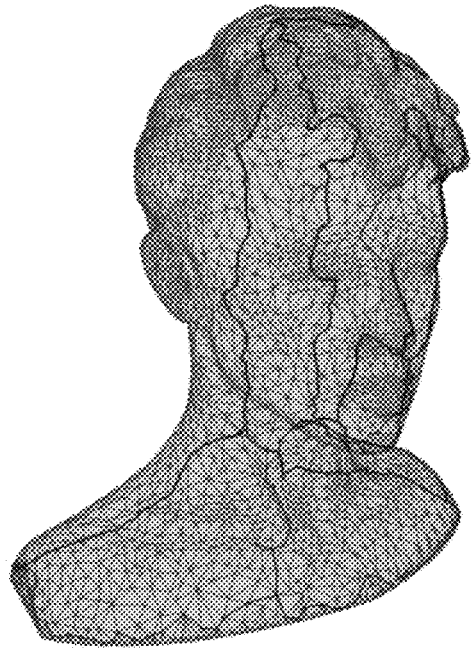
FIG. 3 shows a chart creation on the mesh of FIG. 2.

The parameterization may be preceded by a step of cutting the mesh into charts. This is illustrated on FIG. 3 that shows the chart creation on the mesh of FIG. 2 provided as input at step S10. This allows dealing with meshes of arbitrary genus (the number of topological "holes" in the shape) and to reduce it to a single topological disc, as known in the art.

Then, at step S30, the mesh parameterized at step S20 is converted into an image; namely the image I. This means that the parameterization of the mesh results in a set of vertices having 2D coordinates that forms a raster image, wherein each vertex of the set is a pixel of the raster image and the coordinate (x, y, z) of each vertex of the set is stored in the color channels red/blue/green of the raster image.

Thus, the output of step S30 is a Geometry Image. Geometry Image has been disclosed in Xianfeng Gu, Steven J. Gortler, and Hugues Hoppe, *Geometry images*, In Proceedings of the 29th annual conference on Computer graphics and interactive techniques, pages 355-361. ACM Press, 2002. A Geometry Image provides an improved conversion of a polygonal mesh into 2D image representation. A geometry image, as known in the art, is obtained from a transformation of an arbitrary surface of a 3D modeled object onto static mesh as a 2D image, which is a completely regular remesh of the original geometry of the 3D modeled object, and that support reverse transformation. The geometry image provides a completely regular structure that captures geometry as a simple 2D array of quantized points. Surface signals like normals and colors are stored in similar 2D arrays using the same implicit surface parameterization—texture coordinates are absent.

Figure 5:
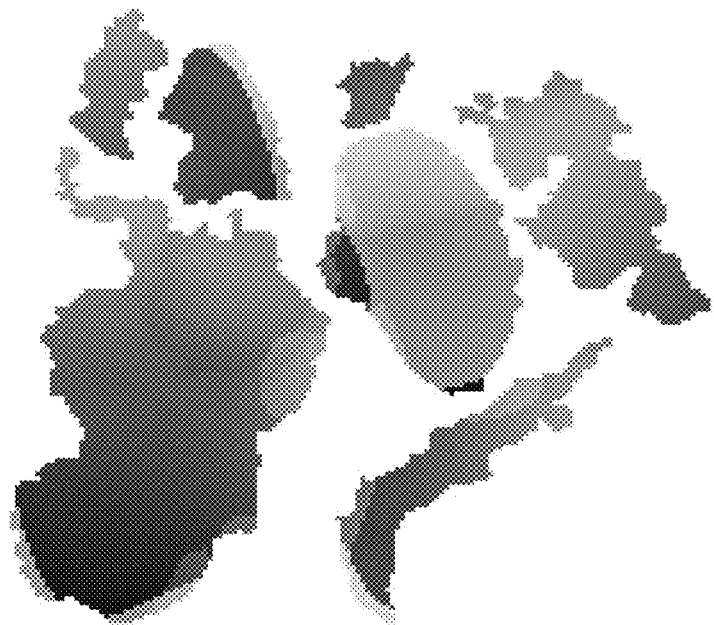
FIG. 5 shows a Geometry Image obtained from the parameterized mesh of FIG. 4.

FIG. 5 illustrates the geometry image obtained from the mesh of FIG. 2. Each pixel forming this image is a vertex and the color of the pixel codes the coordinate (x, y, z) of the vertex.

For the sake of explanation only, a mathematical definition of an image is now discussed. An image is a mapping from a spatial domain $\Omega$ (the spatial domain $\Omega$ being of dimension d) to V that is the space of image values (V is of dimension c). No assumption on the nature of $\Omega$ or V is taken in order to define an image in its most general meaning.

For instance, a 2D) image I of dimension m by n, which spans 256 shades of gray in a computer memory can be defined as a mapping (equation 1):

$$I : \Omega = [\![0, \ldots, m-1]\!] \times [\![0, \ldots, n-1]\!] \to V = [\![0, \ldots, 255]\!]$$
$$x \in \Omega \mapsto I(x) \in V$$

In this example, the spatial domain $\Omega$ is of dimension d=2 and the space of image values V is of dimension c=1. The 2D image can be considered as a discrete image as it is defined on a discrete spatial domain $\Omega$. This is opposed to continuous images that are defined on a spatial domain $\Omega$ of the form: $\Omega = \mathbb{R}^d$ Discrete transformations usually refer to transformations that act on discrete images, while continuous transformations act on continuous images. Since only a discrete image space can be represented in the computer's memory, numerical methods such as interpolation are used to compute the values of the image in integer positions *[[0, . . . , m]] $\subset \mathbb{R}$ ), as known in the art.

The next steps S40 to S80 aim at outputting a so-called Summary Image from a Geometry Image, e.g. the geometry image outputted at step S30. A Summary Image is a computational method linking a Significance Images to a spline based image interpolation. For instance, spline may be a B-Spline based free form deformations. However, the steps S40 to S80 could be carried out with other spline based interpolations, e.g. NURBS. The significance image allows identifying the relevant parts in the image. The significance image is the same size as the original image (e.g. the Geometry Image), for each pixel in the original image the pixels in the significance image define the cost of altering the corresponding pixel in the original image. The computation of a Significance Image for Geometry Image will be discussed in reference to step 40.

Over the original image domain, a free form deformation grid (or any other spline based interpolation graph) is defined. Or said otherwise, a grid of cells is defined from the image I, each cell being defined by a set of control points. Moving control points of the graph changes the transformation applied to the image and in turn transforms the image. For instance, the transformation may be a diffeomorphic transformation, which renders the resulting image smooth with smooth derivatives.

The deformation of a cell is obviously linked to the displacement of the vertices, and in turns influences the deformation of the image. The cells as closed cycles of the graph delimited by at least 3 vertices, which exactly were the cells of the grid in the case of the regular grid of Free Form Deformations. And then comes the question of defining which vertices in the deformation grid should be moved and how much, one shows that under certain assumptions the movement of the vertices always led to a diffeomorphic transformation. To answer this question, a Summary Image is defined. The Summary Image shows the result of a relevance computed for each cell of the grid. Thus the Summary Image acts as a proxy to the Significance Image and quantifies the cost of deforming one cell in the graph as defined by the Significance Image. The Summary Image counts as many pixels as the number of cells in the deformation graph and each pixel in the Summary Image quantifies the cost of deforming the corresponding cell in the graph. The computation of the Summary Image will be discussed in reference to steps 50 to 80.

Referring back to the flowchart of FIG. 1, at step S40, a Significance Image S is provided by computing a significance of each pixel in the image I, e.g. the Geometry Image. The image significance is defined as a cost associated with each pixel of the image. This cost is directly linked to the amount of information the pixel conveys. The amount of information conveyed by a pixel may be, but is not limited to, the relevance of the pixel in the image, e.g. the relevance may be determined by the user. The significance of a pixel of the image I quantifies the importance of the pixel for the integrity of the image. Hence, the image significance of image I shows the pixels in image I that convey greater information than others.

Figure 6:
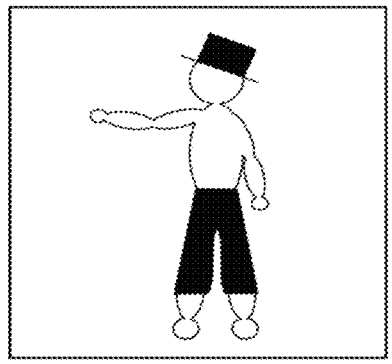
FIGS. 6 and 7 show an example of the image significance computation n example of the system.

For instance in FIG. 6, reducing the white zones on the left and the right of the character will not change the visual understanding of the scene: indeed, the onlooker will gather the same information from either image of FIG. 6 and one in which the white regions are reduced. Ideally image significance will have higher values in areas where the content cannot be tempered with without a major alteration of the visual appearance.

In practice, the image significance is itself represented as an image. Furthermore, the spatial domain of both the image and the Significance Image are the same; in other words, the pixel locations in both images represent the same spatial positions.

The value assigned to each pixel of the Significance Image represents the amount of information conveyed by a pixel. This is as illustrated on FIG. 7 that shows the Significance Image obtained from the image of FIG. 6: in FIG. 7, the darker areas represent high informative content areas. The representation of the Significance Image allows easily comprehending that all white areas can be reduced without impacting largely the image global informative power.

Figure 7:
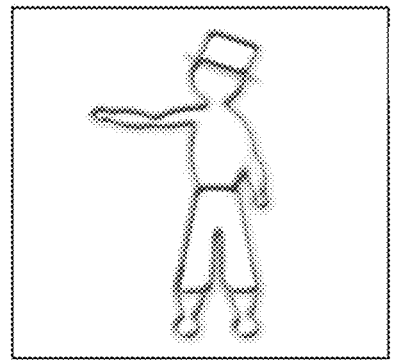

Any image significance computation methods known in the art can be used. For instance, one of the most basic ways to compute image significance may be used: a smoothed out version of the image gradient norm wherein the smoothing is done using 2D Gaussian filters. FIG. 7 displays the image of FIG. 6 on which the gradient norm of image has been smoothed. As another example of image significance computation, image saliency computation may be used. Image saliency aims at finding relevant parts of an image for image segmentation. Interestingly, image significance may also be computed by using the motion information when the images are not static but dynamic, e.g. as is the case in a video. This is particularly useful when retargeting videos, to maintain time coherence between the retargeted frames of the video. The motion information is usually coded as the optical flow of the image and could be computed using any of the methods known in the art.

Preferably, the Significance Image Sig I is computed with the function of the equation 7:

$$\text{Sig } I = \alpha E_{geom} + (1-\alpha) E_{norm} \text{ where } \alpha \in [0;1].$$

The term $E_{geom}$ is the $c^{th}$ color channel of the image I and the term $E_{norm}$ is the $c^{th}$ color channel of the image of normal.

$E_{geom}$ is defined as follow (equation 7a):

$$E_{geom} = \sum_{c \in RGB} \sqrt{\left(\frac{\partial}{\partial x} G_\sigma * geom(c)\right)^2 + \left(\frac{\partial}{\partial y} G_\sigma * geom(c)\right)^2}$$

and $E_{norm}$ is defined by the equation 7b:

$$E_{norm} = \sum_{c \in RGB} \sqrt{\left(\frac{\partial}{\partial x} G_\sigma * norm(c)\right)^2 + \left(\frac{\partial}{\partial y} G_\sigma * norm(c)\right)^2}.$$

In both equations 7a and 7b, one uses a Gaussian kernel $G_\sigma$ that allows defining the Significance at scale $\sigma$ for multi-scale computations. Especially, in Geometry Images, reducing with higher priority areas with redundant vertices is critical, which translate to smooth areas with low gradients. This is the point of the definition of the Geometry Image Significance Sig I. Usage of the parameterized mesh normal when available allows further protecting areas in the mesh with noticeable ridges.

Interestingly, the computation of the significance of each pixel (that is, the computation of the Significance Image) may also comprise a user interaction to protect areas in the mesh to compress. The user selects vertices of the mesh to be protected (e.g. he selected an area of the mesh). This is translated into a chart of vertices to be protected. The entire chart cost is set very high in the Image Significance: the coefficient $\alpha$ is set $\alpha=0$ for the pixels of the Geometry Image linked to the vertices of the chart. The value of a may be set close to 0; for instance, the value of $\alpha$ can be comprised in the range of values [0; 0,2].

Conversely, an area of the mesh may need a drastic simplification. The user selects vertices of the mesh to be protected (e.g. he selected an area of the mesh). This user selection is translated into a chart of vertices to be protected. The entire chart cost is set very low in the Image Significance: the coefficient $\alpha$ is set $\alpha=1$ for the pixels of the Geometry Image linked to the vertices of the chart. The value of $\alpha$ may be set close to 1; for instance, the value of $\alpha$ can be comprised in the range of values [0,8; 1].

Next, at step S50, an original spatial domain of the Significance Image is extracted. The original spatial domain is noted $\Omega$. The spatial domain is a domain (for instance a plane) where a digital image is defined by spatial coordinates (x,y in the case of 2D image, $x \in \mathbb{R}^d$ in the general case) of its pixels. As discussed, the spatial domain of the Significance Image may be the same as the spatial domain of the image I to compress. In the case where both spatial domains of the Significance Image and image I are the same, the pixel locations in both images represent the same spatial positions.

Then, at step S40, a transformation, noted $T_\theta$, is provided. $T_\theta$ is parameterized as an interpolating spline by a set of control points from the original spatial domain ($\Omega$) to a resized spatial domain ($\Omega'$). The term transformation means an operator that is applied to the image I pixel positions and simply displaces the position of existing pixels of I, resulting in a resized image J. Hence, the transformation acts on the pixel coordinates, not their values. Any kind of transformation is possible, from a discrete transformation where only a subset of pixels coordinates of the image I to resize is concerned, to continuous transformation where all the pixels of the image I are concerned. The transformation is noted $T_\theta$, wherein T is meant to designate a transformation and $\theta$ is meant to designate the parameters of the transformation, as it will be explained latter.

For the sake of explanation, a mathematical definition the transformation $T_\theta$ is now discussed. An image transformation such as the transformation $T_\theta$ is a mapping from an input spatial domain $\Omega$ to an output spatial domain $\Omega'$. The input spatial domain $\Omega$ may be the original spatial domain of the Significance Image extracted at step S40. The output spatial domain $\Omega'$ can be the spatial domain of the resized image J. $\Omega'$ is a resized version of $\Omega$. $\Omega$ and $\Omega'$ have the same density. The term density characterizes the type of values inside the space (real, quantified, integral . . . ) but possibly with different bounds. The transformation has got all the properties of the mapping from $\Omega$ to $\Omega'$, i.e. if the mapping is linear then the transformation is said to be linear, if the mapping is continuous then the transformation is continuous.

The resized image J is defined as the image I to resize to which the transformation $T_\theta$ is applied. Hence, for all position x of the pixels in $\Omega$, one applies the following equation (equation 2):

$$J(T_\theta(x))=I(x)$$

Figure 11:
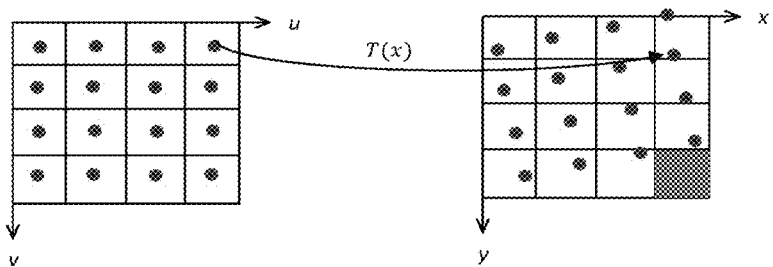
FIG. 11 shows an example of forward mapping transformation.

In other words, in each new position $y=T_\theta(x)$ of a pixel, the value of I(x) is copied in J(y). The values of the pixels are not modified, only their positions can be modified. Pixels are moved 'forward' from the coordinate frame of the image to resize to the resized image; in this case a forward mapping is carried out, as illustrated on FIG. 11 wherein the shaded square illustrates empty pixel because the transformation maps to non-integral positions in the new image.

Interestingly, the transformation $T_\theta$ may be invertible. That is, the transformation can be inverted. In this case, for all position x in the spatial domain $\Omega$ of the image I to resize, one applies the following equation (equation 3):

$$J(x)=I(T_\theta^{-1}(x))$$

Figure 12:
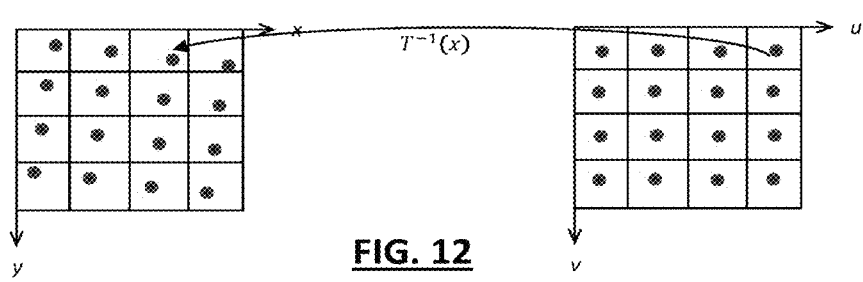
FIG. 12 shows an example of backward mapping transformation.

As a result of equation 3, every pixel in the resized image J will be assigned a position in the image I. Pixels are moved 'backward' from the coordinate frame of the resized image J to the image to resize J; in this case a backward mapping is carried out, as illustrated on FIG. 12. This backward mapping can be performed because an interpolation scheme is possible when dealing with non-integer positions in the original position space. In practice, any transformation inversion scheme may be used. For instance, the inversion scheme discussed in Gary E. Christensen, Hans J. Johnson: *Consistent Image Registration. IEEE Trans. Med. Imaging* 20(7): 568-582 (2001) may be used.

The transformation $T_\theta$ provided at step S60 may be a diffeomorphic transformation $T_\theta$. A diffeomorphic transformation is a transformation that is continuous, bijective, differentiable, of bijective derivative, the inverse of which is also continuous and differentiable. Advantageously, a diffeomorphic transformation transforms the image to resize in a smooth manner without creating any artifacts even in the derivatives of the image to resize. This is opposed to a piecewise smooth transformation, wherein the input spatial domain $\Omega$ is partitioned, that creates artifacts on the edges of the partitions. Each of these artifacts creates high frequencies that render the images less prone to compression. Another advantage of a diffeomorphic transformation is that the transformation is invertible: all the transformations that appear non-natural are discarded, thus avoiding the foldover problem that is well known. Indeed, when the transformation is not invertible in one place, one can possibly obtain that two different pixel positions in the spatial domain $\Omega$ map to the same pixel position in the resized spatial domain $\Omega'$. It results in a visual effect of an image being fold over itself.

The transformation $T_\theta$ is parameterized. This means that the transformation is not made explicit on the whole spatial domain $\Omega$ because it is computationally impractical as spatial domain $\Omega$ may be very large (possibly infinite). The parameterized transformation can be evaluated in each and every position in $\Omega$, but for a limited number of parameters that is smaller than the cardinality of $\Omega$.

The transformation $T_\theta$ is parameterized as an interpolating spline. A spline, as known in the art, is a piecewise-defined polynomial function, depending on the degree of the spline, the degree of smoothness at the connection between pieces can be set. The degree of smoothness of the spline in the piece connections is also the overall degree of smoothness of the spline. Splines have control points, also called interpolation nodes. The displacement of the control points modifies the shape of the spline. Hence, transformation $T_\theta$ is parameterized by a set of control points of the interpolating spline that parameterizes $T_\theta$.

Any kind of spline can be considered for parameterizing the transformation function $T_\theta$. In practice, there are splines of particular interest for image processing such that, but not limited to:

Thin Plate Splines discussed in Bookstein, Fred L. "Principal warps: Thin-plate splines and the decomposition of deformations." In *IEEE Transactions on Pattern Analysis and Machine Intelligence archive*, Volume 11 Issue 6, June 1989, Page 567-585;

Free Form Deformations discussed in Sederberg, Thomas W., and Scott R. Parry. "Free-form deformation of solid geometric models." In Proceeding of *SIGGRAPH '86*

*Proceedings of the* 13*th annual conference on Computer graphics and interactive techniques*, Pages 151-160;

Non Uniform Rational B-splines or NURBS discussed in Piegl, Les A., and Wayne Tiller. "The NURBS book".

The transformation is a mapping from an input spatial domain $\Omega$ to an output spatial domain $\Omega'$. The transformation $T_\theta$ may be, for each pixel, the sum of the pixel position x and its displacement $u_\theta(x)$ where $u_\theta$ a mapping from $\Omega$ to $\Omega$ is'. For all position x in $\Omega$, the transformation $T_\theta$ can be represented by the following equation (equation 4):

$$T_\theta = x + u_\theta(x)$$

Using this representation of the transformation $T_\theta$ advantageously allows representing $T_\theta$ in terms of displacements of pixels, without loss of generality. The transformation is decomposed into the component associated to its position and the actual displacement of the pixel position, transformation can be quite large even when the displacement is small (on large domains).

Figure 13:
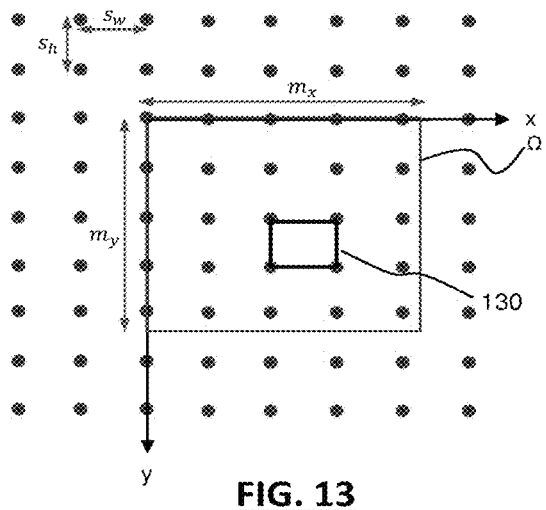
FIG. 13 shows an example of B-spline interpolation grid.

Referring now to FIG. 13, where is illustrated an example of a set of control points defined over the original spatial domain $\Omega$ extracted from the Significance Image. Incidentally, one can notice that several control points are outside original spatial domain $\Omega$. In this example, the original spatial domain $\Omega$ is of dimension d=2 and is represented by the shaded rectangle. The set of control points controls the parameters of the interpolating spline that parameters the transformation $T_\theta$ and they are represented by the black dots. For the sake of explanation only, the discussion focusses on Free Form Deformations (FFD) interpolation spline.

The position of each control point positions can be denoted as $\theta(ij)$ where $\theta(ij)$ is a 2D vector representing the position of the (i,j) control point. The control points are arbitrarily indexed from left to right and from top to bottom with indices i and j respectively. The spacing between two control points in the horizontal direction can be denoted as $s_w$ and in the vertical direction as $s_h$, in the same fashion the projection of the position x in the original spatial domain $\Omega$ on the horizontal axis as $x_w$ and the projection of the position x in the original spatial domain $\Omega$ on the vertical axis as $x_h$. The spatial domain of the image I to resize is also considered as being oriented from left to right and from top to bottom.

The horizontal and vertical directions are arbitrarily chosen and may be defined using a reference frame (x,y). For instance, in FIG. 13, a reference frame is represented by two arrows having a common origin, which is located on the top-left corner of $\Omega$. Hence, in FIG. 13, the x-axis represents the horizontal direction, and the y-axis represents the vertical direction.

Still in reference to FIG. 13, the set of control points forms a regular grid wherein the control points are uniformly spread over the original spatial domain $\Omega$. The grid of control points has been obtained from FFD; 2D Bezier interpolation splines have been computed that are, depending on the degree of the spline, supported by four control points in this example. The term regular grid involves that the value of the original horizontal spacing $s_w$ between two control points is always the same. Similarly, the value of the original vertical spacing $s_h$ between two control points is always the same. The horizontal spacing $s_w$ may have the same value as the vertical spacing $s_h$, as shown on FIG. 13. It is to be understood that the control points of a set of control points of FIG. 13 may be moved during the process of the invention, as it will be explained below.

Figure 14:
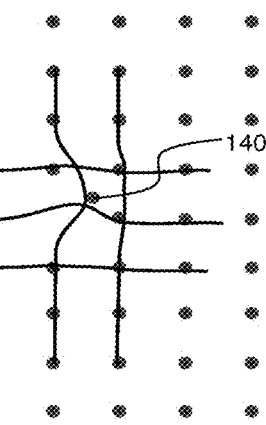
FIG. 14 shows an example of the effect of displacement of a control point of B-spline interpolation grid.

Interestingly, the set of control points creates a new domain that is defined over the original spatial domain $\Omega$. This new domain is named $\Lambda$ and is discussed latter. $\Lambda$ acts on $\Omega$, which means that the displacement of a control point (for instance the control point 140 in FIG. 14) will affect the spline that, in turn, will locally affect $\Omega$.

As previously discussed, the transformation $T_\theta$ is a mapping from an input spatial domain $\Omega$ to an output spatial domain $\Omega'$, the transition from $\Omega$ to $\Omega'$ being the sum of the pixel position x and its displacement $u_\theta(x)$. From any pixel position, the displacement function $u_\theta(x)$ may be obtained from the control point positions. Hence, the displacement function $u_\theta$ of equation 4 may be defined as weighted linear combination of the control points' positions, as shown in the following equation 5:

$$u_\theta(x) = \sum_{k=0}^{3} \sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) \theta\left(\frac{x_w}{s_w} + k, \frac{x_h}{s_h} + l\right)$$

In equation 5, the representation of FFD uses Cubic B-Splines: the functions $B^k$ and $B^l$ are Cubic B-splines which also coincide with the Bernstein polynomials of the same degree, as known in the art. One understands any B-Splines of a different degree can be used and that the present invention is not limited to B-Splines of third degree. The invention is not limited to B-Splines which are linked to FFD, but any kind of spline as previously discussed.

As previously discussed, the position of each control point can be noted $\theta(i,j)$. In equation 5, $\theta$ is a function that represents the set of control points of the parameterized transformation. In particular, the function $\theta$ is the sole parameter of the transformation $T_\theta$: indeed, the knowledge of $\theta$ allows to completely describe the displacement $u_\theta$ and hence the transformation $T_\theta$. As a result, the displacement of a control point in the grid will change the transformation $T_\theta$ accordingly. The displacement of a control point only affects a local part of the spatial domain $\Omega$: indeed, as described by the equation 5, only the pixel positions x in $\Omega$ in a neighborhood of a size $4s_h \times 4s_w$ around the control point's position are affected by its movement. One understands that the neighborhood size might be different with lesser degree B-Splines.

FFD based on cubic B-splines of the equation 5 are by design smooth to the third degree; the degree is smaller when the order of the Bernstein Polynomial is lower. Invertibility and bijectivity of the displacement and its first derivative is achieved through a constraint on the control point displacement: the transformation resulting from the FFD displacement is diffeomorphic if the displacement of the control point is less than 0.48 times the control point's spacing $s_h$ and $s_w$; this results is known in the art, e.g. in Lee, Seungyong, et al. "Image metamorphosis with scattered feature constraints." in *IEEE Transactions on Visualization and Computer Graphics archive*, Volume 2 Issue 4, December 1996, Page 337-354. Hence, the displacement of positions x in $\Omega$ resulting from the movement of the control points will follow the displacement of the control points. As a result, getting two control points close together will reduce the image in between the control point's locations, while expanding the space between control points will enlarge the image in between the control point's locations. It is to be understood that the surrounding areas ($4s_h \times 4 s_w$) of the displaced positions x in $\Omega$ is also affected in order to keep the continuity in the transformation.

Referring back to FIG. 1, at step S70, the original spatial domain $\Omega$ is subdivided into cells. Each cell is defined by a subset of control points of the set. Hence, the term cell defines a sub-part of the resized spatial domain $\Omega'$, and this sub-part is delimited by a subset of control points. A cell is a closed surface delimited by edges connecting control points of the set. The set of cell forms a spatial domain over the spatial domain $\Omega$. A cell being a closed surface, this involves that a cell is formed by at least three control points.

In FIG. 13, a cell 130 is defined by four edges connecting the four control points. Two diagonal edges, which are within the closed surface of the cell 130, are not represented; these two edges do not contribute to delimit the closed surface of the cell. Still in reference to FIG. 13, the control points form a regular grid of cells; for instance, the cell 130, which is defined by four control points, is a polygon delimited by four control points. It is to be understood that the set of control points do not necessarily form a regular grid; for instance, a cell of more or less than four control points may be used.

The grid obtained from the set of control points can be contemplated as the representation of the coordinates of control points in the spatial domain $\Omega$.

The control points are not defined in the spatial domain $\Omega$, but the position of some control points overlaps with the spatial domain $\Omega$, the cells are defined in the spatial domain $\Omega$ using the control points overlapping with $\Omega$.

The set of cells may be seen as a layer over the original spatial domain $\Omega$. Each cell is associated with one or more pixels of the original spatial domain $\Omega$: the area formed by each cell covers one or more pixels. $\Omega$ and $\Lambda$ are not dissociated, $\Lambda$ is a subdivision of $\Omega$. In the case where $\Lambda$ is a regular grid of 4 cells over $\Omega$ we have the cells indices (0, 0), (0, 1), (1, 0) and (1, 1), and each cell is a subdomain of $\Omega$, e.g. the cell (0, 0) contains $$\left[0, 1, \ldots, \left(\frac{m}{2}\right)-1\right] \times \left[0, 1, \ldots, \left(\frac{n}{2}\right)-1\right]$$

from $\Omega$. This amounts to say that polygons are drawn on the image, each and every pixel in the polygon belongs to the cell.

Reducing the size of a cell, i.e. reducing its surface area is the same as bringing the control points surrounding the cell close together and hence the same as reducing the image domain at the cell's location. This is also true in the case of an augmentation of the cell's size. The image domain actually behaves the same way the cells are deformed. And if the control points that are defined outside the spatial domain $\Omega$ are clamped to stay at a distance $s_w$ and $s_h$ of the control points located inside the spatial domain $\Omega$, then the spatial domain $\Omega'$ of the output image domain will have the same area as the cumulated area of the inner cells. One understands that the number of control points that need to be clamped will depend on the degree of the spline. This results from the transformation $T_\theta$ defined in the equation 4.

At step S70, a set of cell subdividing the original spatial domain $\Omega$ has been determined. This set of cells defines a discrete domain of the original spatial domain $\Omega$, noted $\Lambda$. Each cell can be considered the same way as a pixel location for an image and can be indexed in the same fashion. For instance, if four cells have been defined on the spatial domain $\Omega$ of Equation 1, then the four cells are respectively indexed (0, 0), (0, 1), (1, 0) and (1, 1), and each cell is a subdomain of $\Omega$, e.g. the cell (0, 0) contains [0,1, ..., (m/2)−1]×[0,1, ..., (n/2)−1] from $\Omega$.

Then, at step S80, a weighted average of the significance of the pixels in a cell is computed for each cell of $\Lambda$. Consequently, the significance over $\Lambda$ is defined. A Summary Image S is formed from the set of cells forming $\Lambda$: each cell of the Summary image can be contemplated as being a pixel of the Summary Image.

Since $\Lambda$ is made of partitions of $\Omega$, the domain $\Lambda$ can be written $\Lambda=\{\Omega_{(0,0)}, \Omega_{(0,1)}, \ldots, \Omega_{(K,L)}\}$ where K and L are the number of partitions in each directions of $\Omega$, and $\Omega_{(i,j)}$ is a partition of $\Omega$, the domain covered by the cell (i,j). The horizontal and vertical directions of $\Omega$ may be arbitrarily chosen and may be defined using a reference frame (x,y), as already discussed.

The weighted average is computed using the interpolating spline. Indeed, for each y=(i,j) position in $\Lambda$, it is possible to define the summary image for cubic B-splines FFD. The Summary Image SI can be defined by the equation 6:

$$SI(y) = \sum_{k=0}^{3} \sum_{l=0}^{3} \int_{(i,j)} B^k\left(\frac{x_w}{s_w} - \left\lfloor \frac{x_w}{s_w} \right\rfloor\right) B^l\left(\frac{x_h}{s_h} - \left\lfloor \frac{x_h}{s_h} \right\rfloor\right) S(x)\, dx$$

wherein S(x) is the function that represents the provided Significance Image.

Figure 8:
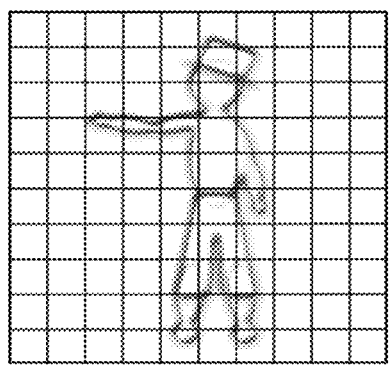
FIGS. 8 and 9 show an example of the summary image computation.

Referring now to FIG. 8, it is shown the Significance Image of the image of FIG. 7 on which a set of cell defines a discrete domain $\Lambda$ of the original spatial domain $\Omega$. The domain $\Lambda$ is laid over the original spatial domain $\Omega$ of the Significance Image. In FIG. 8, the domain $\Lambda$ completely covers the original spatial domain $\Omega$ of FIG. 7. Furthermore the set of cells has been obtained from a set of control points forming a grid of control points uniformly spread over the original spatial domain $\Omega$, as discussed in reference to FIG. 13.

Figure 9:
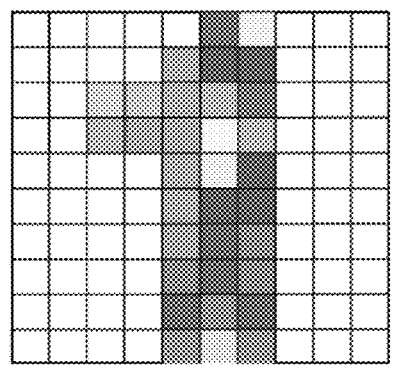

Referring now to FIG. 9 it is shown a Summary Image computed from the set of cells forming $\Lambda$, a weighted average of the significance of the pixels in a cell has been computed for each cell. Each cell of the Summary image is colored using a gray scale used for representing the significance of a cell, and therefore the significance of a set of pixel comprised in the cell. For instance, the areas on the left and the right of the character are represented in white, thus meaning these areas are not significant for the visual understanding of the scene.

Back to the flowchart of FIG. 1, at step S90, one or more cells are of the Summary Image are selected, thus forming a set of cells. The selection is performed according to the relevance of each cell of the Summary image. The cells having a relevance that is lower than a pre-determined threshold are selected. The relevance is in this example the significance, that is, the cell(s) with a significance that is lower than a pre-determined threshold is(are) selected.

Typically, the selection of one or more cells of the Summary Image may comprise determining one or more cells having the lowest relevance, or the lowest relevances—in this latter case. For example, to reduce a finite number k of cells at the same time, the k cells with the lowest summary image relevance. k is a positive natural number. As another example, a percentage p of cells with the lowest relevance can be used. It is to be understood that the selection of the cells is not limited to the above-mentioned selection strategies. Interestingly, the optimization strategy when reducing the cells in the present invention benefits from a wider search space as no constraint on the respect of rectangle image boundaries is necessary. Hence, it is possible to reduce cells one at a time, without trying to impose regularity in a path of cells in the image.

Now, cells of the Summary Image have been selected according to their relevance. The Summary Image is reduced at steps S100 to S120, that is, colored areas of the Geometry Image that comprise useless information regarding the mesh of the image I are simplified. The reduction is done in an iterative way through different cells in the Summary Image, and also in a multi-scale way as to avoid local minima in the Significance Image and be able to reduce large areas as well as small areas in the final mesh.

Back to the flowchart of FIG. 1, at step S100, the one or more cells previously determined at step S90 are modified. This amount to say that control points of splines are displaced. The cells of the original spatial domain $\Omega$ are deformed by displacing one or more control points of the cells having a lesser weighted average as the relevance of the cells have been computed from the weighted average of the significance of the pixels of each cell.

One algorithm amongst the algorithms known to be used in the field of content aware algorithm for removing or adding pixels for resizing an image may be applied directly to the summary image, excepted that these algorithms will operate on cells (that is, groups of control points) instead on pixels. These algorithms are guided by the image significance and will tune the transformation parameters to change the image according to some optimality constraint while changing the image summary the least. As already explained, the image does not need to keep straight edges and does not need to distort the least the image.

Operating on the cells thus involves that the algorithm (i) identifies one or more cells with lesser weighted average (step S90), and (ii) modify the size of the identified cells (step S100) instead of removing or adding pixels as done by these algorithms). The size of the corresponding cells will be modified, as previously discussed:

the size of a cell is reduced when said cell has been identified by the algorithm as having to be removed;
the size of a cell is increased when said cell has been identified by the algorithm as a pixel having to be added. In practice, the resizing of the cells may be done up to 0.48 times the control point's spacing in order to keep the diffeomorphicity of the transformation.

When reducing the size of a cell, which is the most typical case during reduction of the Geometric Image, this may be performed by bringing closer to the vertices of the cell to reduce all the vertices to the left and to the right of the cell, and bringing closer to the vertices of the said cell to reduce all the vertices to the top and to the bottom of the cell. This is the most efficient way to reduce a cell of a regular grid—a regular grid comprises rectangular or square cells only—. The reduction of a cell is preferably accompanied by displacements of other cells of the grid, e.g. the cells of the grid that surround the reduced cell are moved so that the reduction of one cell causes the reduction of the image. Said otherwise, the cells not reduced while a cell is being reduced are forced to move: the blank fields (also referred to as empty areas) obtained after the reduction of the cell are filed with surrounding cells that have been displaced. Here the surrounding cells are the other cells (as opposed to the reduced cell) not reduced. One understands that the displacement of control points for reducing a cell is not limited to this example: many heuristics for reducing a single cell might be employed.

Then, at step S110, a transformation is computed for each pixel of the image from the resulting grid, that is, from the grid deformed at step S100.

In the example of the flowchart, the transformation $T_\theta$ is computed over a spatial domain of the image I using the displaced one or more control points. The function $\theta$ of equation 5 is a function that represents the set of control points of the parameterized transformation, and the function $\theta$ is the sole parameter of the transformation $T_\theta$. Hence, once the control points have been displaced, as performed at step S70, the parameters of the transformations $T_\theta$ are set. It is therefore possible to compute the transformation $T_\theta$ as defined in equation 5.

Finally, at step S120, an image J (that can be also referred to as new image J) is computed by applying the computed transformation $T_\theta$ to the spatial domain of the geometry image I. The image J is defined on the resized spatial domain $\Omega'$. Applying the computed transformation $T_\theta$ means that the mapping from the input spatial domain $\Omega$ of the image I to an output spatial domain $\Omega'$ of the image J is carried out: the position of each pixel is modified in accordance with the equation 3 and 4.

As already discussed, the reduction is done in an iterative way through different cells in the Summary Image, so that the steps S40-S120 are repeated until an acceptable result is reached. Many criteria for stopping the iteration can be used. For instance, the iteration may stop when no more cell of the grid has relevance lower than the pre-determined threshold. As another example, it may stop when all the cells have been modified. Another criterion may be that the new image J has a compression rate that reaches or even exceed a particular value. A further example of criteria for stopping the iteration is that the number of pixels of the new image J reaches a given value threshold, e.g. the number of pixels of J is two times lower than pixel number of the image I.

The iteration process of steps S40 to S120 may further comprise that the number of control points of the set is increased at each set of a given number of iteration. This is also referred to as multi-scale transformation graph update. This avoids local minima in the Significance Image and allows reducing large areas as well as small areas in the final mesh.

The new image J is a reduced version of the Geometry Image I representing the mesh provided at input of the method. This image J can be further compressed using a known image compression algorithm such as, but not limited to, JPEG, . . . .

The new image J can serve for rebuilding a new mesh. The construction is carried out by use of the image J. Interestingly, no connectivity date needs to be stored: indeed, the transformation of the provided mesh may preferably comprise a step of cutting the mesh into charts as previously discussed in reference to FIG. 3. Hence, as the provided mesh have been cut along the holes, any remeshing algorithm can be used on the compressed mesh (that is, on the image J).

Figure 10:
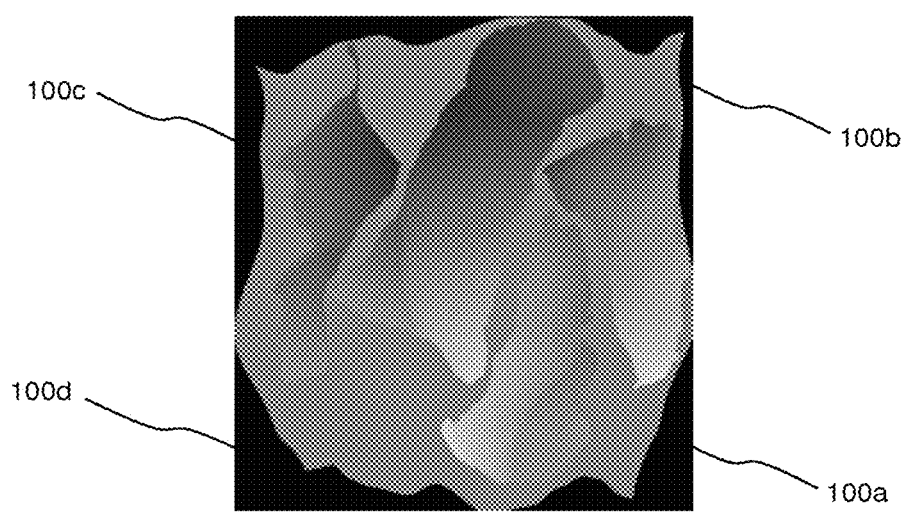
FIG. 10 shows a Geometry Image obtained according to the invention.

FIG. 10 shows a new image J of the geometry image of FIG. 5. Interestingly, the areas 100a to 100d that are represented in black do not belong to the new image J and are here only to show that the compressed image J does not need to keep straight edges as this is not necessary for compressing a geometry image.

Figure 15:
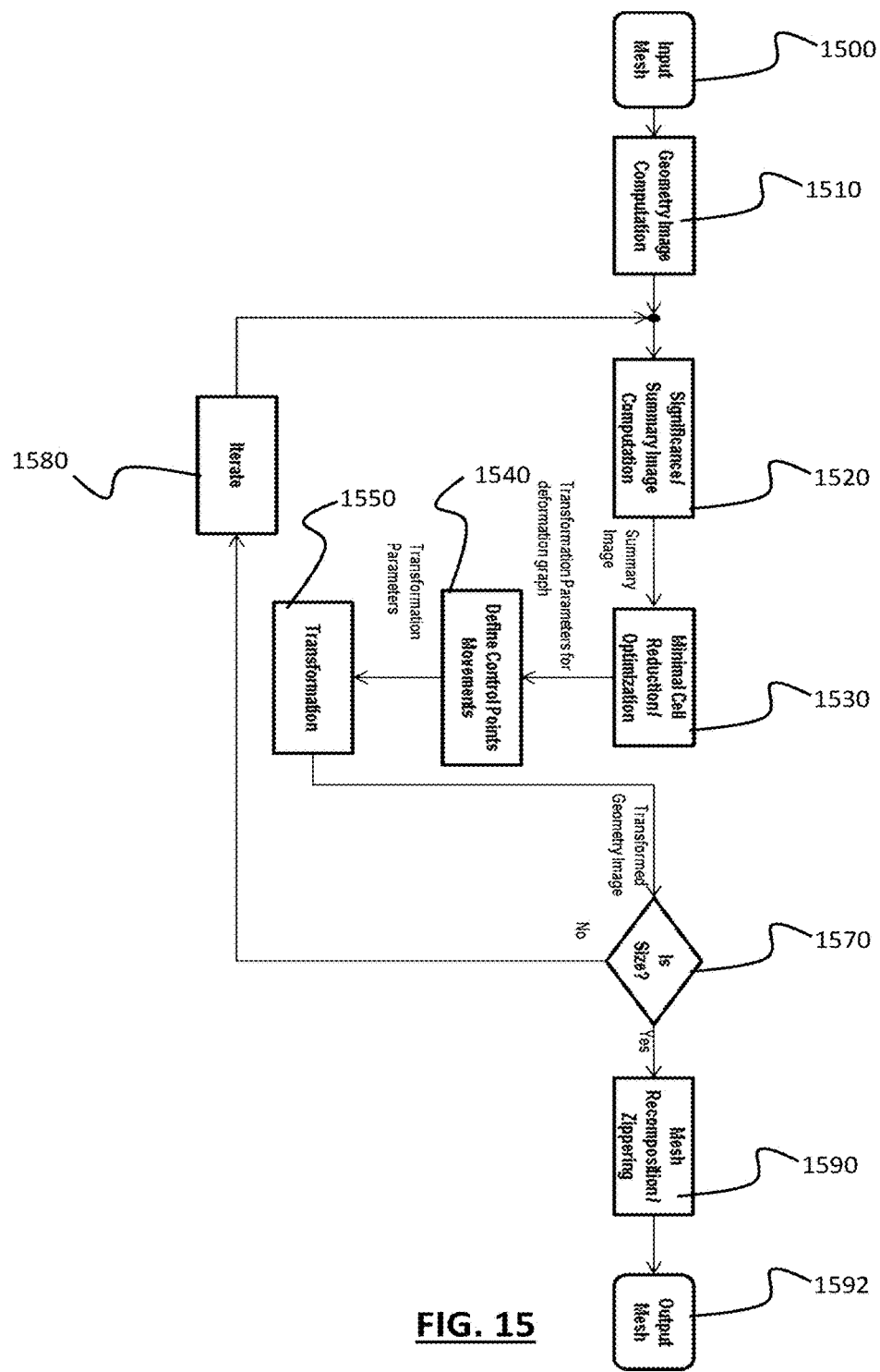
FIG. 15 shows an example of computational modules of a computer program for performing the invention.

Referring now to FIG. 15, it is shown an example of computational modules of a computer program for performing a compression of a 3D mesh according to the invention. Each modules comprises instructions executable by a computer, e.g. the processing circuitry of the computer system of FIG. 16.

A Geometry Image computation module 1510 takes as input a mesh 1500 of a 3D modeled to compress (step S10).

The module 1520 computes a significance of each pixel of the Geometry Image I computed by the module 1510 (steps S20-30). The output of the module 1520 computes the Significance Image of the image I in accordance with step S40. The module 1520 further computes the Summary Image in accordance with the steps S50 to S80. One understands that two separate modules might perform the computations of the module 1520; one module for computing the Significance Image and one module for computing the Summary Image. Thus, the module 1520 computes set of control points of the interpolating spline that parameterizes the transformation $T_\theta$. The summary image computation module 1520 may implement several kind of interpolation spline function; the selection of one spline function may be performed upon user action, or by default. The set of control points obtained from the interpolation spline may be represented as a grid, e.g. the regular grid wherein the control points are uniformly spread over the original spatial domain $\Omega$ of the Image I.

A minimal cell reduction and optimization module takes as input the summary image. The optimizer module returns which cells of the Summary Image have a relevance (the significance) that is lower than a predetermined threshold (step S90). This module implements one or more known algorithms able to identify one or more cells with lesser weighted average and to make the decision to modify the size of the identified cells can be used. Thus, this module provides transformation parameters of the Summary Image. The selection of one algorithm among several one may be performed upon user action, or by default.

A control point movement module 1540 defines displacements of one or more control points, as defined at step S100. The module 1540 output is thus transformation parameter that modifies the grid of control points. This module deduces the control point positions from the output of the module 40.

The transformation module 1550 computes the transformation $T_\theta$ (step S110) and apply the computed transformation $T_\theta$ on the spatial domain of the image I of the mesh to compress (step S120). The output of the transformation module is a resized image J.

It is then tested by a test module 1570 whether the new size of the image I (that is, the size of the image J) complies with a criterion. If the image J does not reach an acceptable result, then, the process is reiterated. The iteration is managed by the iteration module 1580, and the control of the iteration relies on the modules 1570 and 1580. In the event the image J complies with the expected criteria (e.g. the number of pixels of J), the output of the transformation module 1550 is considered as being the image J. In the event the resized image does not comply with the expected size, the whole process (steps S40 to S120) is repeated with new transformation parameters: new displacements of control points are decided by the modules 1530 and 1540.

Interestingly, the Image Significance can be recomputed at any time with the current displaced grid if the algorithm that is used in the Significance Image module 1520 needs to recompute the Image Significance. The final image is only computed once in the end when the obtained transformation is applied to the original image I.

The present invention advantageously allows reusing some computational modules already in use with current content aware image retargeting such as the one described in Seam carving for content-aware image resizing. Existing significance computation module 1520, optimization cell module 1530 and transformation module 1550 might be reused. This advantageously limits development costs and eases the integration of the invention with current content aware image retargeting software.

The module mesh recomposition/zippering module 1590 reconstructs the mesh from the image J, that is, from the compressed image I. The output 1592 of this module is a mesh that is substantially the same as the mesh provided at step S10; the compression removed some vertices of the original mesh so that the uncompressed mesh slightly differs from the original mesh of step S10. As previously mentioned in reference to FIG. 3, the input mesh can be of arbitrary genus and it is initially cut to reduce it to a single topological disc. The charts of arbitrary shape are packed in the Geometry Image. A zippering algorithm is used to remove discontinuities between the chart boundaries and create a watertight surface, as known in the art. The resmeshed charts are tied together. This zippering operation is typically performed by the module 1590.

The preferred embodiment of the present invention has been described. It will be understood that various modifications may be made without departing from the spirit and scope of the invention. Therefore, other implementations are within the scope of the following claims. For instance, multi-scale/multi-resolution approaches that increase the computational speed (as described in Lee, Seungyong, George Wolberg, and Sung Yong Shin. "Scattered data interpolation with multilevel B-splines", *In IEEE Transactions on Visualization and Computer Graphics*, Volume 3 Issue 3, July 1997, Page 228-244) can be also used in the present invention without any modification to the algorithm; the image significance only needs to be recomputed after each new scale/resolution level.

The invention claimed is:

1. A computer-implemented method for compressing a three-dimensional modeled object, comprising:
   providing a mesh of a three-dimensional modeled object;
   parameterizing (u,v) the mesh on a two-dimensional plane;
   converting the parameterized mesh into an image I;
   defining a grid of cells from the image I, each cell being defined by a set of control points;
   computing a relevance of each cell of the grid;
   determining at least one cell having a relevance lower than a pre-determined threshold;
   resizing the at least one determined cell and computing a resulting grid;
   computing a transformation for each pixel of the image from the resulting grid; and
   applying the computed transformation to the image I.

2. The computer-implemented method of claim 1, wherein the determination of the said at least one cell having a relevance lower than a pre-determined threshold comprises the determination of a set of one or more cells having the lowest relevance.

3. The computer-implemented method of claim 1, further comprising:
   providing an image significance by computing a significance of each pixel in the image I;
   extracting an original spatial domain ($\Omega$) of the Significance Image;
   providing a transformation $T_\theta$, parameterized as an interpolating spline by a set of control points, from the original spatial domain ($\Omega$) to a resized spatial domain ($\Omega'$),
   wherein defining a grid of cells from the image I comprises subdividing the original spatial domain ($\Omega$) into cells, each cell being defined by a subset of control points of the set, wherein computing a relevance of each cell of the grid comprises computing, for each cell, a weighted average of the significance of the pixels in the cell, the weighted average being computed using the interpolating spline, and wherein computing a transformation for each pixel of the image I from the resulting grid comprises computing the transformation $T_\theta$ over a spatial domain of the image I obtained by the conversion of the parameterized mesh from the resulting grid.

4. The computer-implemented method of claim 3, wherein the transformation $T_\theta$ is parameterized as a free form deformation interpolating spline, wherein displacement function $u_\theta(x)$ is defined by the equation $$u_\theta(x) = \sum_{k=0}^{3} \sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) \theta\left(\frac{x_w}{s_w} + k, \frac{x_h}{s_h} + l\right)$$

wherein $B^0, B^1, B^2, B^3$ are Cubic B-splines functions, $\theta$ is a function representing the control points, $s_w$ is the spacing between two control points in an horizontal direction, $s_h$ is the spacing between two control points in a vertical direction, $x_w$ is the position of a pixel in the original spatial domain ($\Omega$) on an horizontal axis, $x_h$ is the position of a pixel in the original spatial domain ($\Omega$) on a vertical axis, and wherein the set of control points form a grid and $\theta$ is the function representing the grid of control points.

5. The computer-implemented method of claim 3, wherein the computation of the significance of each pixel is carried out with the function $$SI = \alpha E_{geom} + (1-\alpha) E_{norm}$$

where $\alpha \in [0;1]$, where $$E_{geom} = \sum_{c \in RGB} \sqrt{\left(\frac{\partial}{\partial x} G_\sigma * geom(c)\right)^2 + \left(\frac{\partial}{\partial y} G_\sigma * geom(c)\right)^2}$$

and geom(c) is the $c^{th}$ color channel of the image I and $G_\sigma$ is a Gaussian kernel, where $$E_{norm} = \sum_{c \in RGB} \sqrt{\left(\frac{\partial}{\partial x} G_\sigma * norm(c)\right)^2 + \left(\frac{\partial}{\partial y} G_\sigma * norm(c)\right)^2}$$

and norm(c) is the $c^{th}$ color channel of the image of normal and $G_\sigma$ is the Gaussian kernel.

6. The computer-implemented method of claim 5, wherein the computation of the significance of each pixel further comprises:

selecting, upon user action, two or more vertices of the mesh;

translating the user selection into a chart of vertices; and setting the coefficient $\alpha=0$ to minimize the significance of the pixels of the image I linked to the vertices of the chart.

7. The computer-implemented method of claim 5, wherein the computation of the significance of each pixel further comprises:

selecting, upon user action, two or more vertices of the mesh;

translating the user selection into a chart of vertices; and setting the coefficient $\alpha=1$ to maximize the significance of the pixels of the image I linked to the vertices of the chart.

8. The computer-implemented method of claim 1, wherein the steps of defining a grid of cells from the image I, computing a relevance of each cell of the grid, determining at least one cell having a relevance lower than a pre-determined threshold, resizing the at least one determined cell and computing a resulting grid, computing a transformation for each pixel of the image from the resulting grid, and applying the computed transformation to the image I are iterated until the computed transformation to the image I satisfied a compression criteria.

9. The computer-implemented method of claim 8, wherein the iteration stops when at least one of the following criteria is reached:

no more cell of the grid has a relevance lower than the pre-determined threshold;

a compression rate of a new image J obtained by applying the computed transformation to the image I, reaches a given threshold; and a number of pixels of a new image J obtained by applying the computed transformation to the image I, reaches a given value threshold.

10. The computer-implemented method of claim 8, wherein the number of control points of the set is increased for each iteration.

11. The computer-implemented method of claim 1, wherein resizing the at least one determined cell comprises reducing the at least one determined cell, wherein the reduction of the at least one determined cell is performed by:

bringing closer to vertices of the said at least one determined cell, all vertices to the left and to the right of the cell; and bringing closer to the vertices of the said at least one determined cell, all vertices to the top and to the bottom of the cell.

12. The computer-implemented method of claim 1, further comprising building a three-dimensional modeled object from a new image J obtained by applying the computed transformation to the image I.

13. The computer-implemented method of claim 1, wherein resizing the at least one determined cell and computing a resulting grid is carried out regardless keeping straight the edges of the image I.

14. A non-transitory computer medium having stored thereon a program comprising instructions for performing computer-implemented method for compressing a three-dimensional modeled object, the method comprising:

providing a mesh of a three-dimensional modeled object;

parameterizing (u,v) the mesh on a two-dimensional plane;

converting the parameterized mesh into an image I;

defining a grid of cells from the image I, each cell being defined by a set of control points;

computing a relevance of each cell of the grid;

determining at least one cell having a relevance lower than a pre-determined threshold;

resizing the at least one determined cell and computing a resulting grid;

computing a transformation for each pixel of the image from the resulting grid; and applying the computed transformation to the image I.

15. A system comprising:
a memory; and
processing circuitry coupled to the memory,
wherein the memory has recorded a computer program for performing computer-implemented method for compressing a three-dimensional modeled object, the method comprising:
providing a mesh of a three-dimensional modeled object;
parameterizing (u,v) the mesh on a two-dimensional plane;
converting the parameterized mesh into an image I;
defining a grid of cells from the image I, each cell being defined by a set of control points;
computing a relevance of each cell of the grid;
determining at least one cell having a relevance lower than a pre-determined threshold;
resizing the at least one determined cell and computing a resulting grid;
computing a transformation for each pixel of the image from the resulting grid; and
applying the computed transformation to the image I.

\* \* \* \* \*